Figure 26:
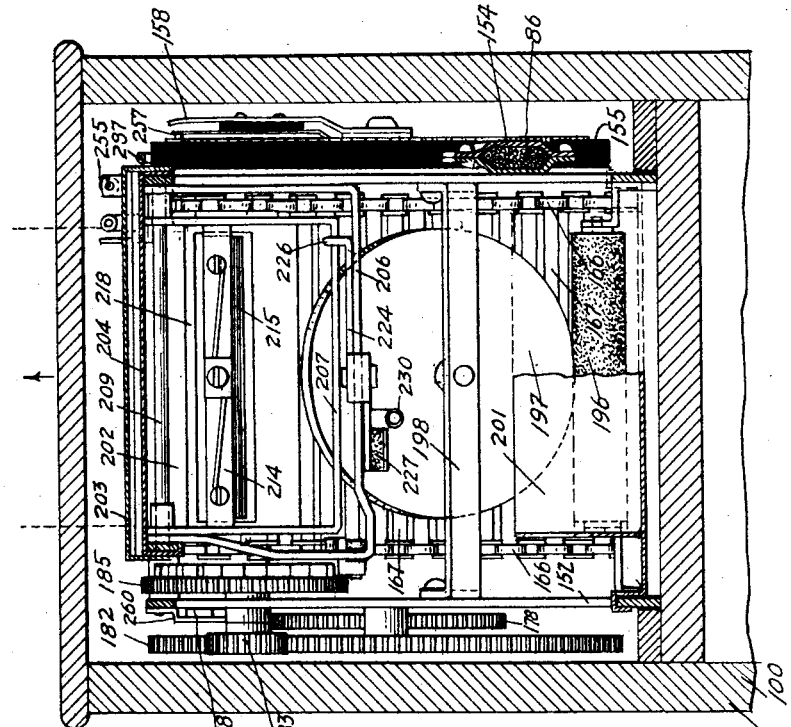

Feb. 14, 1933.  H. C. LAVERY  1,897,941
ANATOMICAL MEASURING AND RECORDING MACHINE
Filed April 16, 1931  11 Sheets-Sheet 1
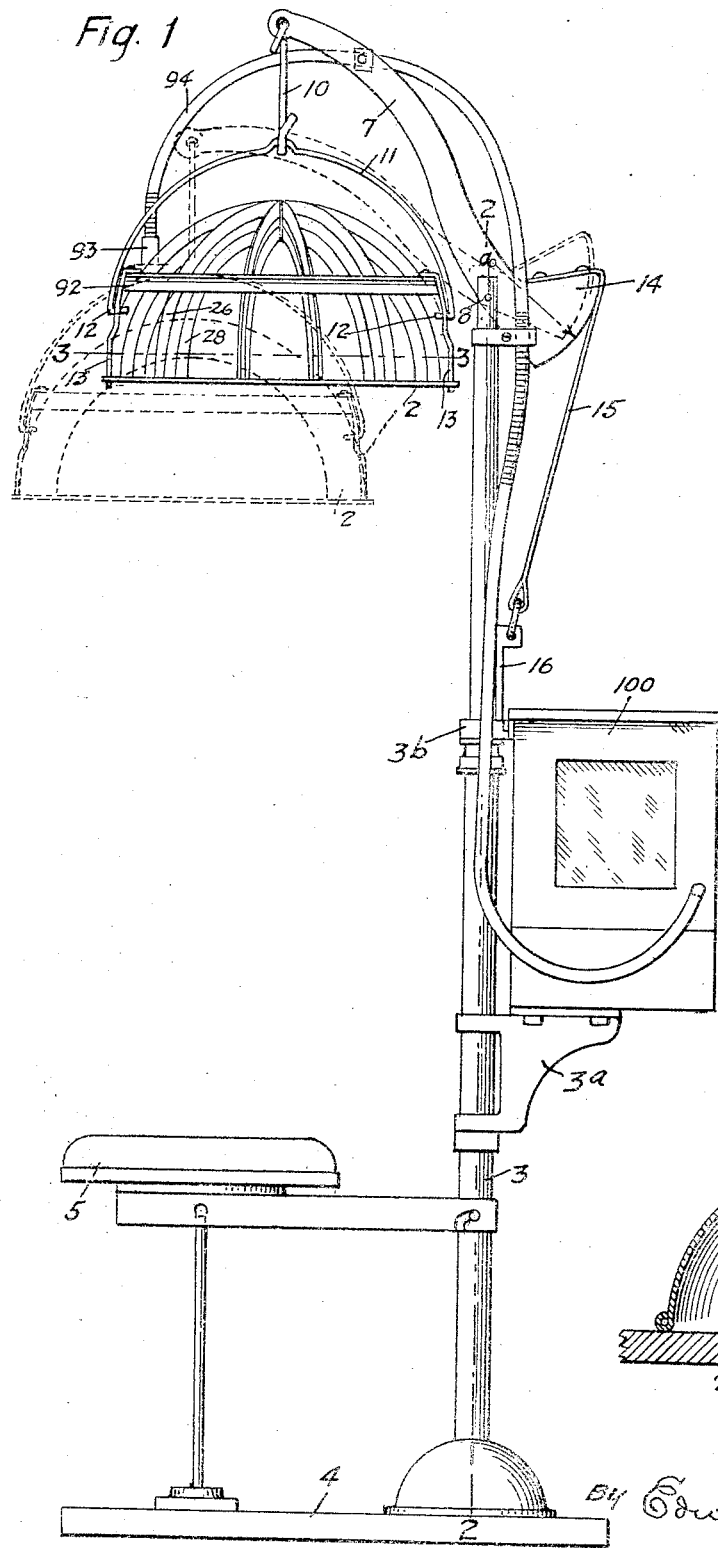
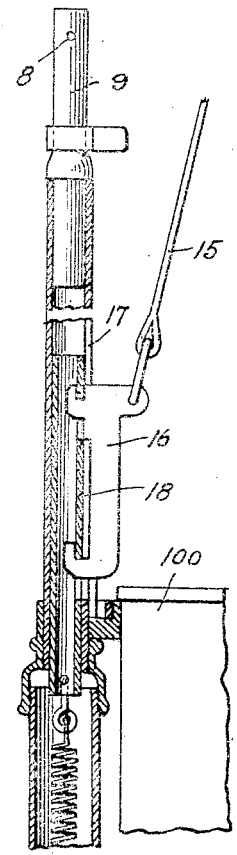
Fig. 1
Fig. 2
Inventor
Henry C. Lavery
By Edwin Guthrie
His Attorney Feb. 14, 1933.   H. C. LAVERY   1,897,941
ANATOMICAL MEASURING AND RECORDING MACHINE
Filed April 16, 1931   11 Sheets-Sheet 2
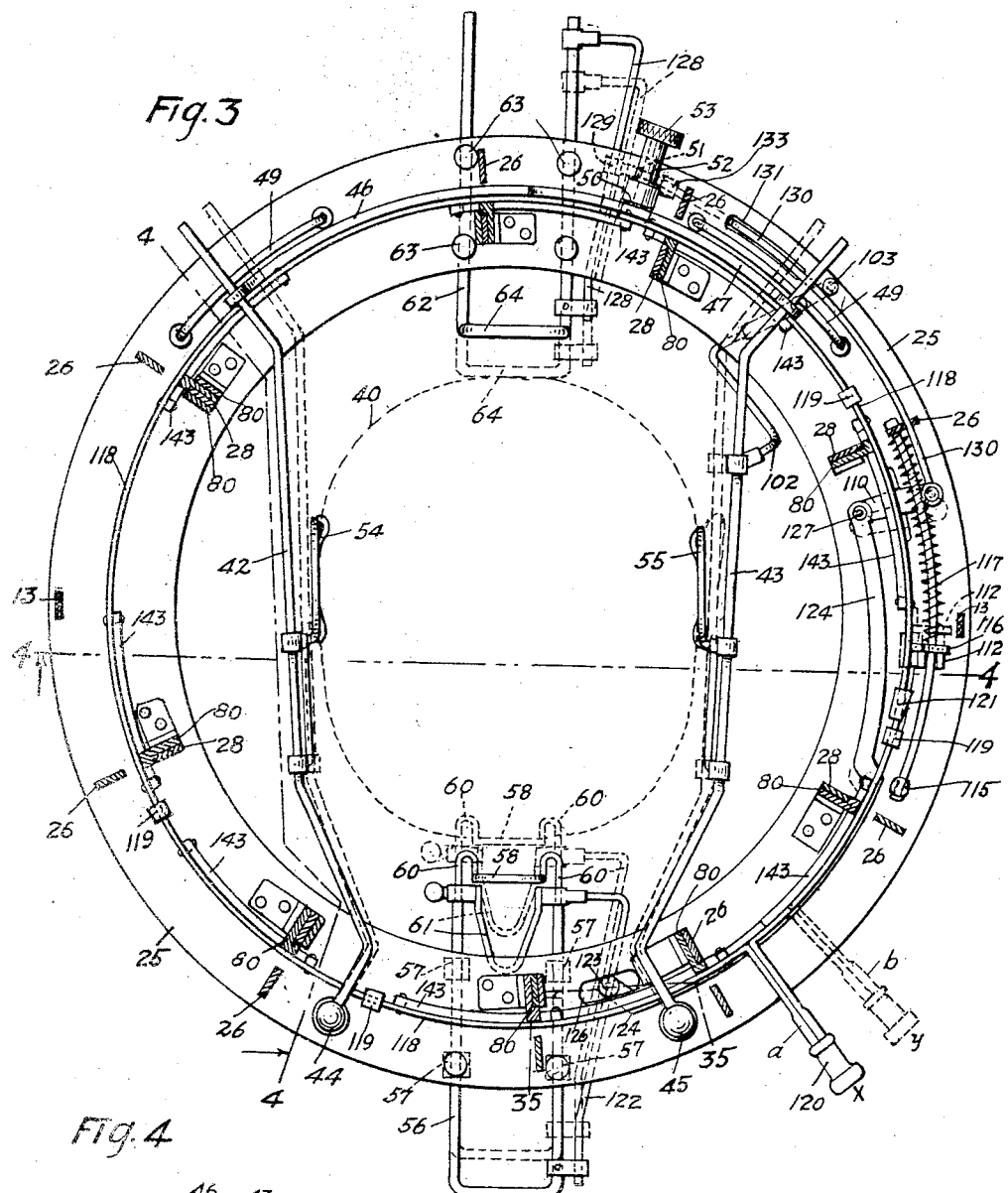
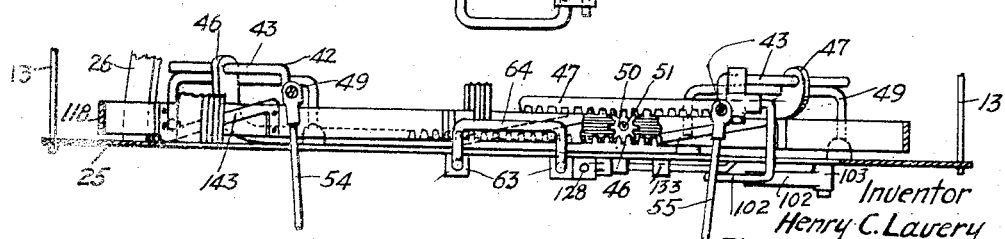
Inventor
Henry C. Lavery
By Edwin Guthrie,
His Attorney Feb. 14, 1933.  H. C. LAVERY  1,897,941
ANATOMICAL MEASURING AND RECORDING MACHINE
Filed April 16, 1931  11 Sheets-Sheet 3
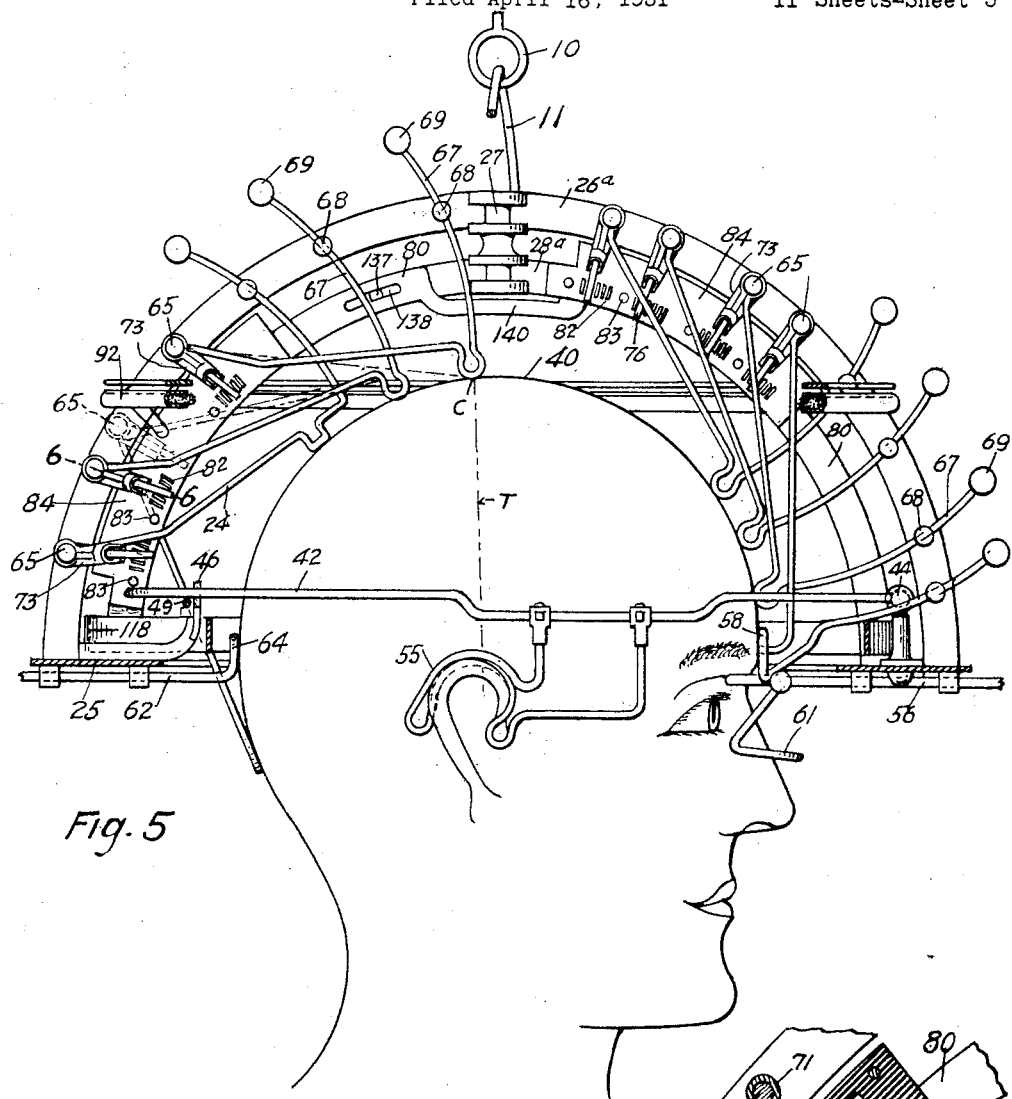
Fig. 5
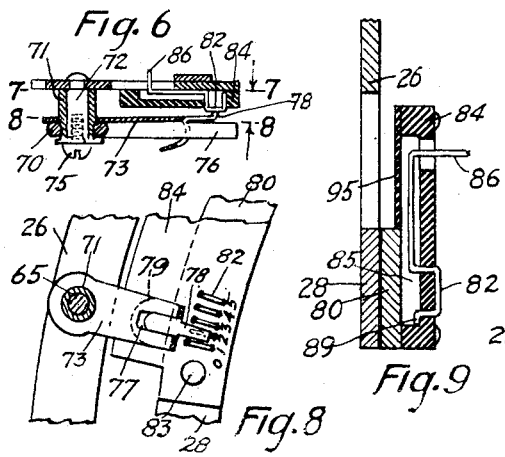
Fig. 6
Fig. 8
Fig. 9
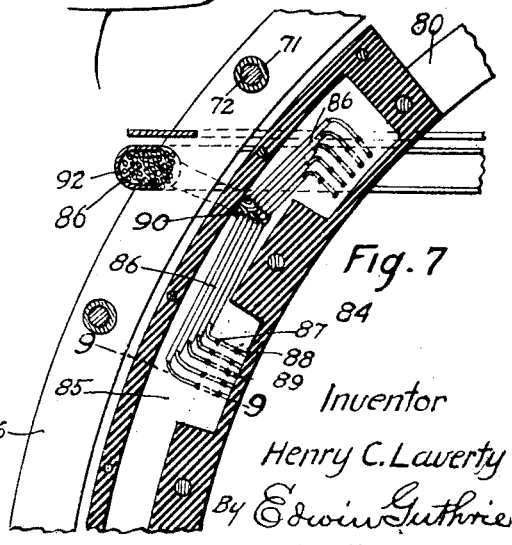
Fig. 7
Inventor
Henry C. Laverty
By Edwin Guthrie,
His Attorney Feb. 14, 1933.　　　　H. C. LAVERY　　　　1,897,941
ANATOMICAL MEASURING AND RECORDING MACHINE
Filed April 16, 1931　　　11 Sheets-Sheet 4
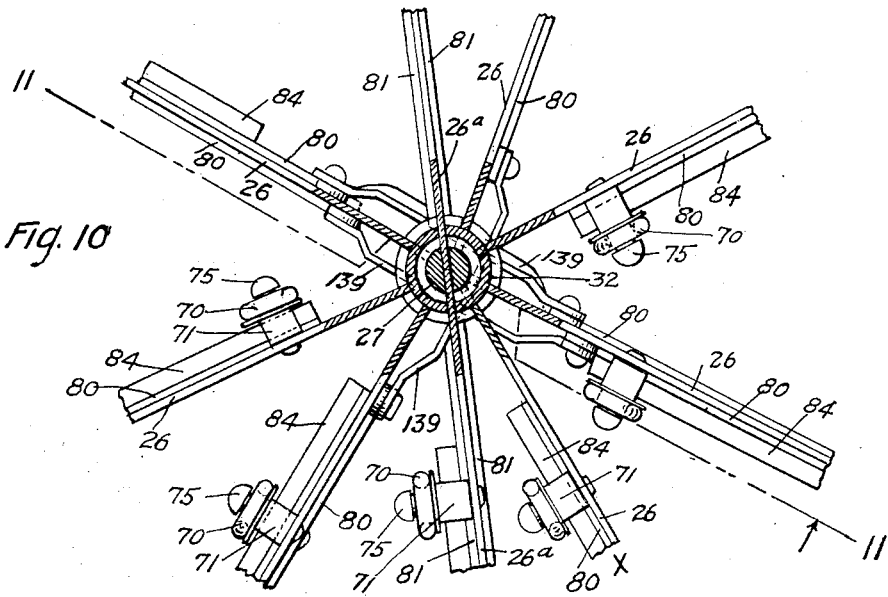
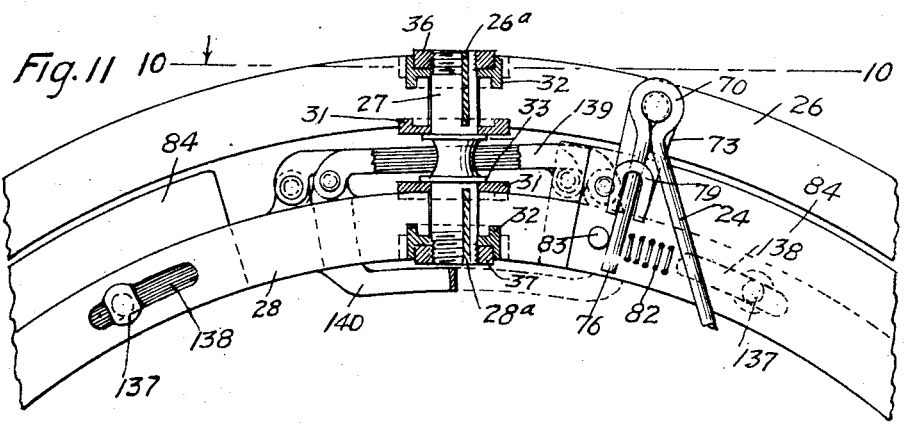
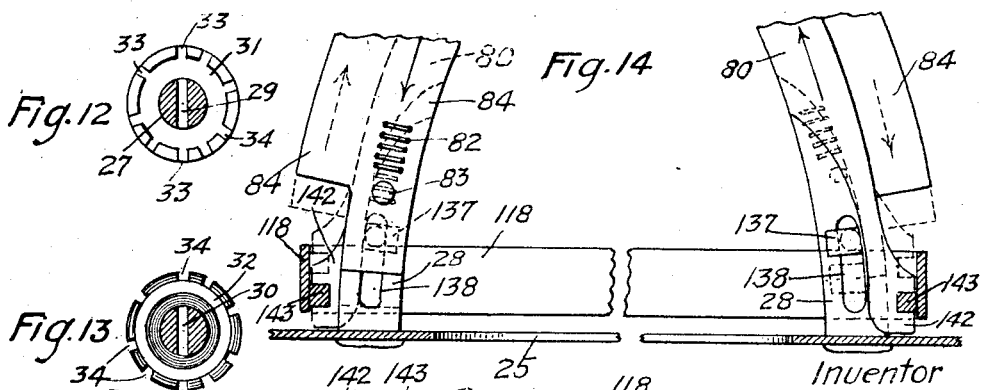
Inventor
Henry C. Lavery
By Edwin Guthrie,
His Attorney

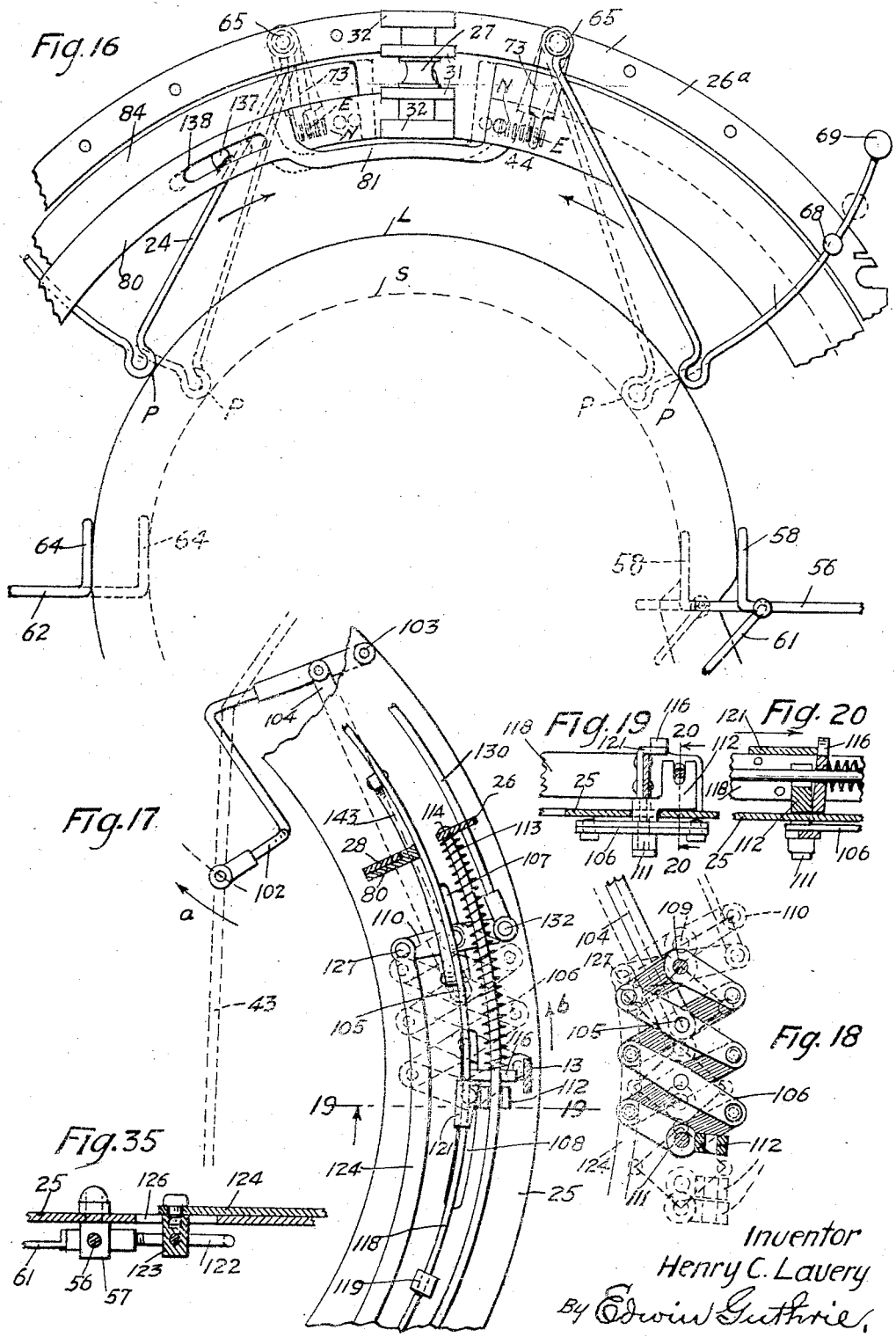

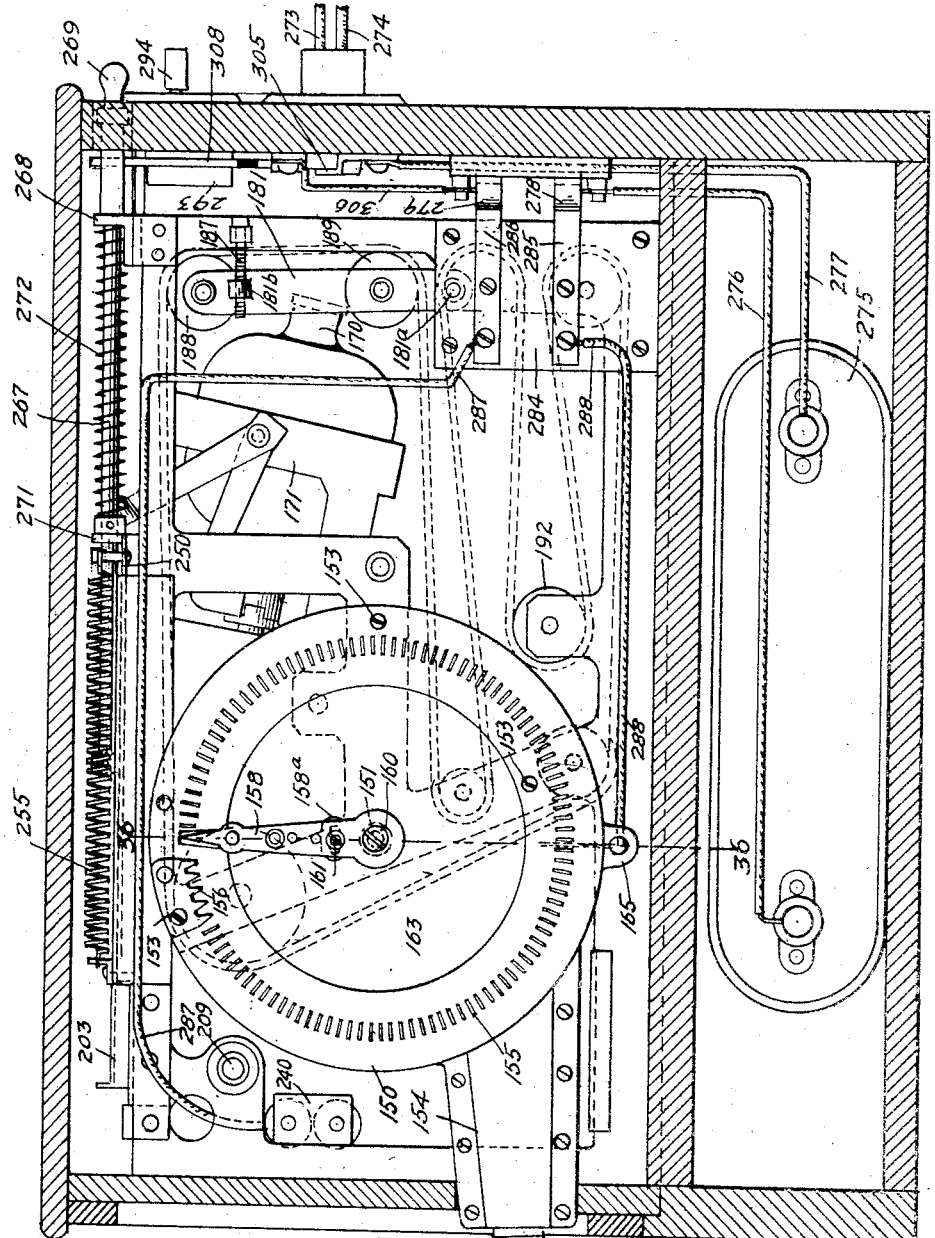

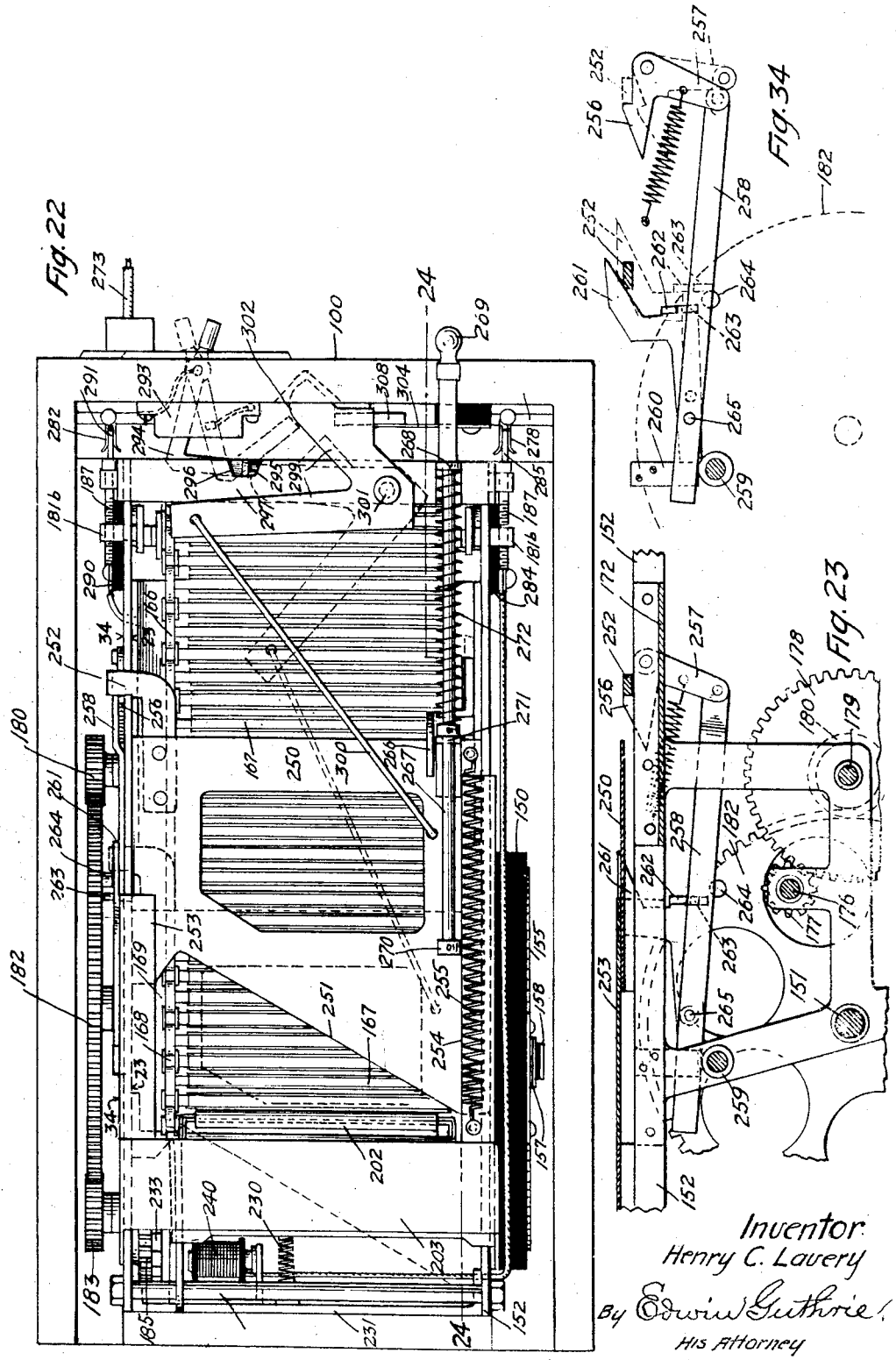

Feb. 14, 1933.   H. C. LAVERY   1,897,941
ANATOMICAL MEASURING AND RECORDING MACHINE
Filed April 16, 1931   11 Sheets-Sheet 8
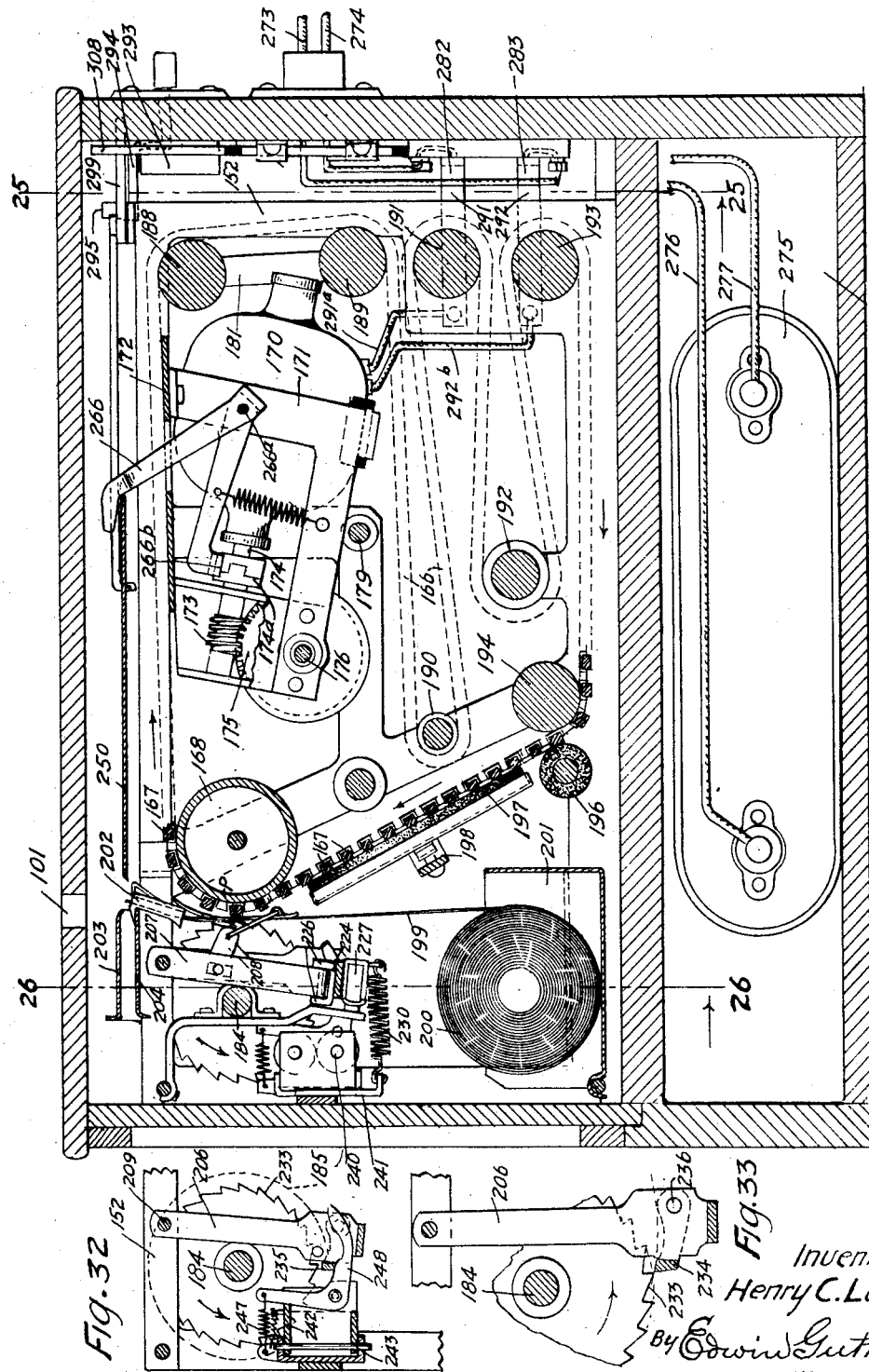
Inventor
Henry C. Lavery
By Edwin Guthrie
His Attorney Feb. 14, 1933.　　　H. C. LAVERY　　　1,897,941
ANATOMICAL MEASURING AND RECORDING MACHINE
Filed April 16, 1931　　11 Sheets-Sheet 9

Inventor.
Henry C. Lavery
By Edwin Guthrie,
His Attorney

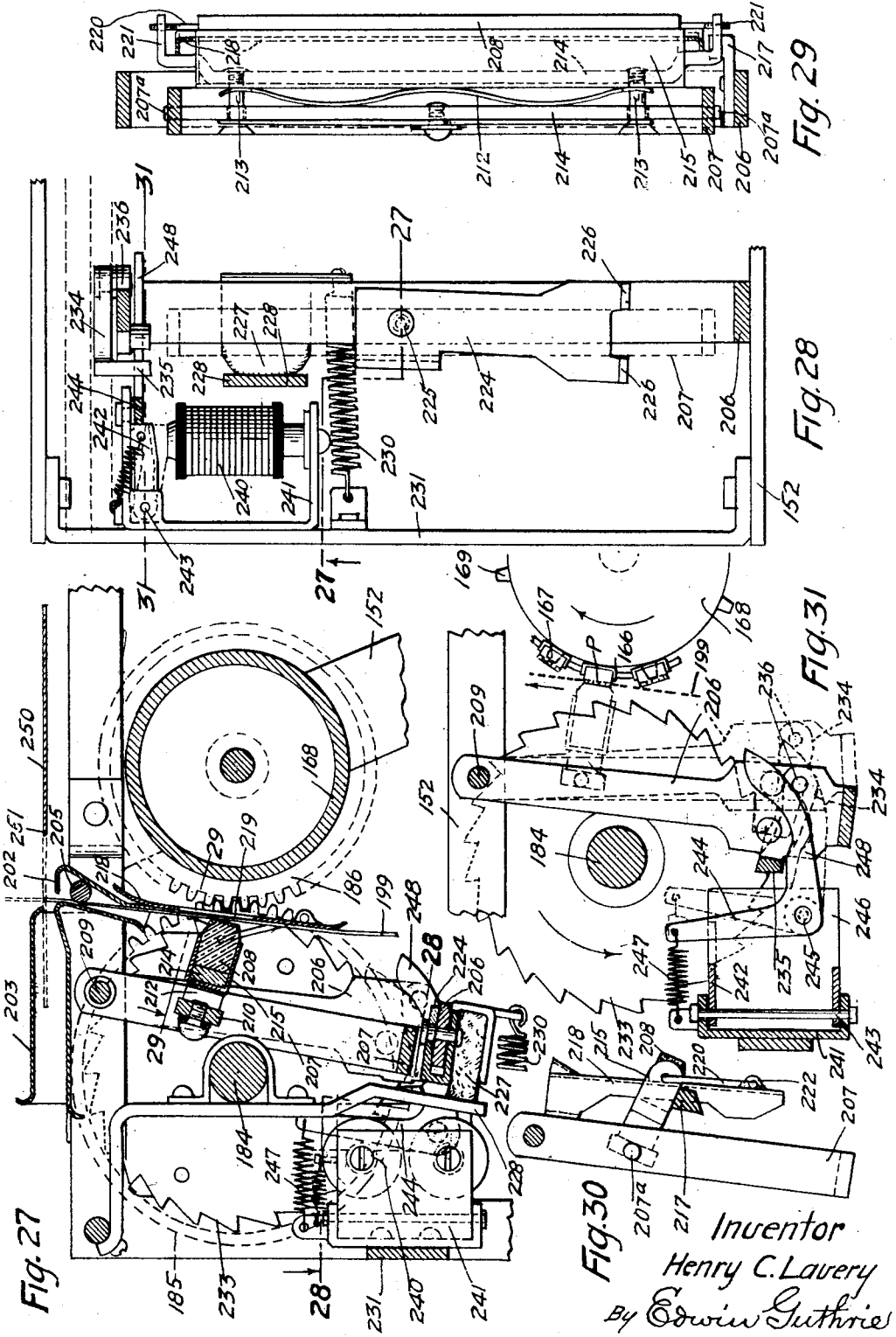

Feb. 14, 1933.  H. C. LAVERY  1,897,941
ANATOMICAL MEASURING AND RECORDING MACHINE
Filed April 16, 1931  11 Sheets-Sheet 11

Inventor
Henry C. Lavery
By Edwin Guthrie,
His Attorney.

Patented Feb. 14, 1933

1,897,941

UNITED STATES PATENT OFFICE

HENRY C. LAVERY, OF MINNEAPOLIS, MINNESOTA

ANATOMICAL MEASURING AND RECORDING MACHINE

Application filed April 16, 1931. Serial No. 530,664.

This invention relates to apparatus for the measurement and delineation of naturally developed characteristics and formations of the human body and specifically of the human brain and is an improved construction of the machine disclosed in Patent No. 788,362 issued to me April 25, 1905. Through psycho-physical researches the faculties of the personality have been found to function in specifically marked and localized zones of the human brain and the comparative development and outward formation of these zones therefore constitute a consistent reliable criterion of the endowments of each particular faculty by the personality, and taken as a whole, are a dependable indication of the general character and special potentialities of the personality.

The primary object of the invention is to provide an apparatus or machine that will, relatively more accurately than has heretofore been done, measure or caliper the development of each of the zones in the human brain expressing a particular faculty not affected by the physical size of the brain and register and automatically print and deliver a permanent record thereof, together with a scientifically prepared printed statement of the significance and specific need of modification for the purpose of aiding in the development and improvement of human character.

The principle of the machine is based on the higher psychological thesis that the human brain is an instrument through which the personality manifests and expresses its character, and the functions of which should, therefore, be under the control of the personality. The adjustments, measurements, and readings of the machine are not, therefore, based on the assumption that a small brain as a whole is comparatively inferior in power and expression of the various faculties and a large brain superior in these qualifications; but the construction and operation of the machine is based upon the proven facts of localized mental and emotional faculties in the psycho-physical matter of nervous energy in the brain and that while the quality of this matter differs for every personality and character, the comparative development and potentiality of each faculty determines the special traits and general character of each person and that the natural shape and contour of the outer covering or skull of the brain consistently reflects this development and potentiality.

A particular object of the invention is, therefore, to provide a mechanism for the measurement and location of the various faculty zones, whereby a variation in the general size of the brain will not affect the comparative variations in the development of the various faculty zones in the recorded results.

With these and other objects in view which will hereinafter appear, the invention consists in the novel construction, combinations and arrangements of parts hereinafter fully described, illustrated in the drawings and particularly pointed out in the claims.

Figure 25:
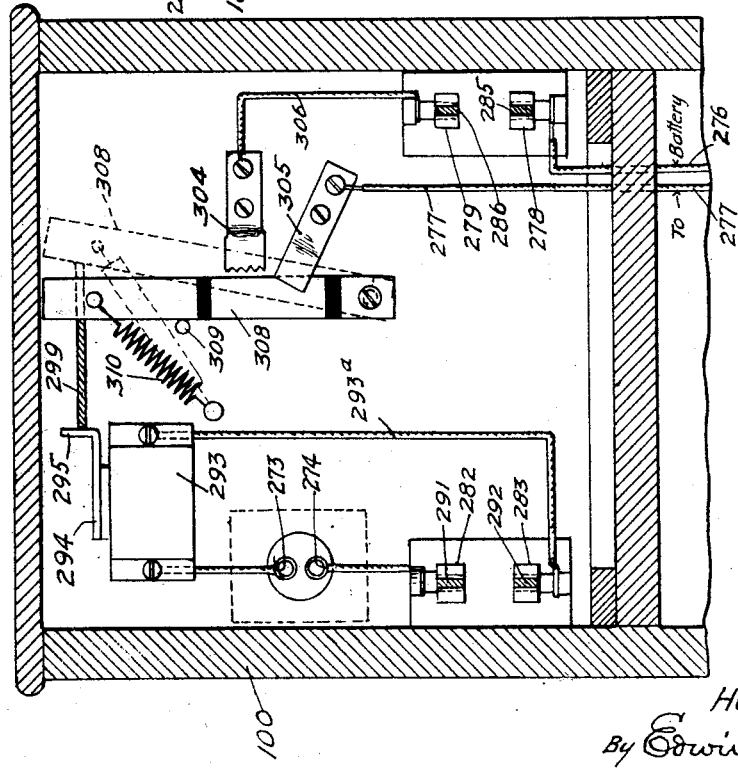
Figures 37, 38:
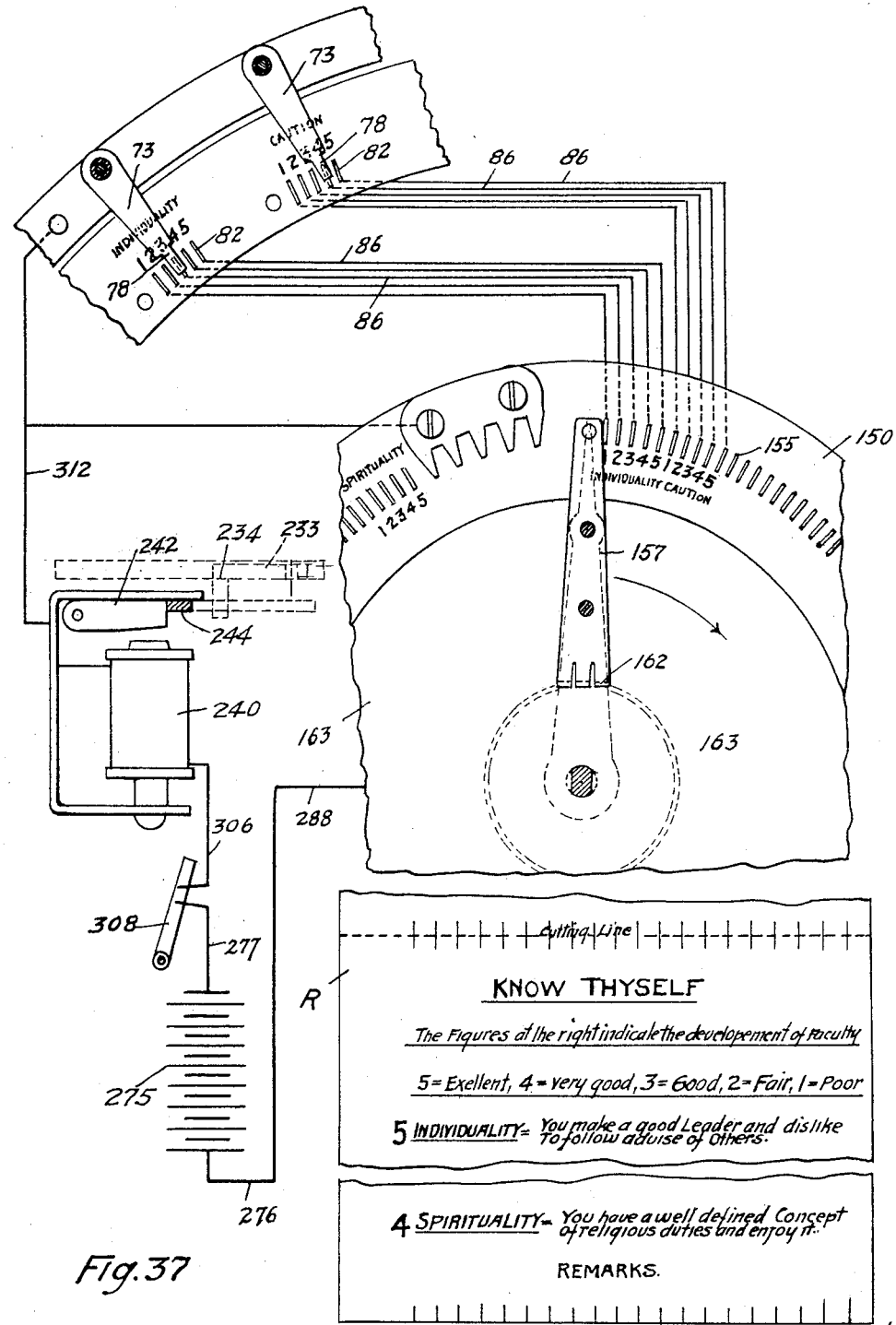

The essential features of the invention involving means for measuring, automatically printing and delivering recorded readings for each of the measured faculty zones of the brain, are obviously susceptible to a wide range of modification of construction without departing from the scope of the invention, but a preferred embodiment thereof is described in the specification and illustrated in the accompanying drawings in which:

Fig. 1 is a side elevation of the frame and supporting standard of an apparatus constructed according to my invention. Fig. 2 is an enlarged vertical section on the line 2—2 of Fig. 1 of the adjustable column or standard upon which the measuring and recording devices are supported. Fig. 3 is a horizontal section taken on the line 3—3 of Fig. 1 showing the mechanism attached to the head piece or helmet for accurately adjusting the said helmet to exact position on the varying forms of human heads. Fig. 4 is a sectional view of Fig. 3 taken on the line 4—4 of Fig. 3. Fig. 5 is a sectional elevation of the head helmet adjusted in position upon a head and showing the measuring fingers or calipers and electrical contact points of one helmet section attached thereto in measuring position on the head. Fig. 6 is an enlarged sectional view of the helmet section on the line 6—6 of Fig. 5. Fig. 7 is a vertical section of the helmet section on the line 7—7 of Fig. 6. Fig. 8 is a section on the line 8—8 of Fig. 6. Fig. 9 is an enlarged cross section of the adjustable helmet section on the line 9—9 of Fig. 7. Fig. 10 is a horizontal sectional view of the helmet taken on the line 10—10 of Fig. 11. Fig. 11 is a vertical section on the line 11—11 of Fig. 10. Figs. 12 and 13 are detail sections of the central hub to which all helmet sections are attached. Figs. 14 to 18 inclusive are detail sections illustrating the universal automatic adjusting features of the helmet to varying sizes of heads. Fig. 19 is a section on the line 19—19 of Fig. 17. Fig. 20 is a section on the line 20—20 of Fig. 19. Fig. 21 is a side elevation of the motor driven recording and delivering machine as arranged within its housing. Fig. 22 is a plan view of the same. Fig. 23 is a vertical sectional view of the machine on the line 23—23 of Fig. 22. Fig. 24 is a vertical section of the machine on the line 24—24 of Fig. 22. Fig. 25 is a vertical section of the housing in which the recording apparatus is mounted, taken on the line 25—25 of Fig. 24. Fig. 26 is a vertical section on the line 26—26 of Fig. 24. Fig. 27 is a full size vertical section of the recording mechanism taken on the line 27—27 of Fig. 28. Fig. 28 is a horizontal section on the line 28—28 of Fig. 27. Fig. 29 is a horizontal section on the line 29—29 of Fig. 27. Fig. 30 is a detail, and Figs. 31 to 33 inclusive are views on the line 31—31 of Fig. 28 illustrating the operation of the recording and delivering mechanism. Fig. 34 is a sectional view taken on the line 34—34 of Fig. 22 illustrating the starting and stopping of the machine. Fig. 35 is a detail section on the line 35—35 of Fig. 3. Fig. 36 is an enlarged vertical section of the electric dialler and synchronizer, taken on the line 36—36 of Fig. 21. Fig. 37 is a diagrammatical view illustrating the electrical connections and synchronism between the measuring and recording sections of the machine. Fig. 38 is sample section of a recorded reading.

The measuring and contact instrument of the machine is illustrated in Figs. 1 to 20 inclusive. Referring in particular to Figs. 1 and 2 of drawings, the helmet 2 upon which the measuring devices are arranged is supported adjustably, for vertical and swinging movement, upon a standard or column 3. The base plate 4 to which the standard 3 is secured also supports a suitable seat 5 upon which the person whose head is to be measured conveniently sits during the examination. Normally when not in operation the measuring helmet 2 is raised to the position shown in full lines in Fig. 1 and is held thereby a slight overbalance induced by a long tension spring 6 arranged within the column 3. An arm 7, pivotally connected at 8 to the upper end of a pin 9 swiveled for turning movement in the column 3, extends upwards and outwards and carries a hooked link 10, which is adapted to receive a bail 11 spanning the helmet 2 and having turned in lower ends 12. The helmet is provided with strips 13 in which the ends 12 of the bail 11 are pivotally engaged slightly above the center of gravity of the helmet, which thus supported may swing or be tilted in any desired direction. The supporting arm 7 carries, opposite its pivotal center, a segment 14 the circular arc of which is centered above the pivotal center of the arm 7 as indicated at $a$. A flexible strap 15 is secured to the upper end of the segment 14 and extends over its arc downwards to a sliding member 16 arranged in a slot 17 in the hollow column 3 and hooked to a tube 18 slideably arranged within the column 3. The tension spring 6 is connected to the tube 18 and, through an adjustable link 19, threaded eyebolt 20 and link 21, also to the column 3. The tension of the spring 6 is adjusted so that, on account of the increased leverage of the strap 15 when engaging the upper section of the segment 14, the spring will hold the helmet in the raised position against its weight. When however the helmet is swung outwards and downwards, the decreasing leverage of the strap 15 against the lower arc of the segment will balance the added weight of the helmet as it swings outward with the result that the frictional resistance of the moving parts operates to balance the helmet in any desired position to fit the height of person's head sitting on the seat 5, as for example the position shown by dotted lines in Fig. 1. After the reading, the helmet is readily raised from the person's head to again assume the position shown in full lines.

In order to accurately locate the caliper members 24 in correct contact with the faculty zones located in different regions of the human brain in varying sizes of heads, it is obviously necessary to adjust the measuring helmet with respect to a standard point common to all heads relative to the location of the faculties. The exact location of the faculty zones is determined phrenologically from a line termed the "basilar circumference," which is a line extending around the circumference of the base of the brain, passing just above the eyebrows and just above the orifice of the ears, and also from the "transcoronal line" which extends from one ear to the other over the top of the head at the highest point. A horizontal line drawn through the external openings of the ears thus furnishes the permanent axis and the point on this axis half way between the ears the point from which, in the same size heads, variations in relative measurements are noted. In adjusting the helmet upon a person's head, therefore, the ear openings form the natural permanent localizing point in respect to which the measuring device must be adjusted.

The instrumentalities for the various adjustments for correct position of the calipering and cranial contacts will hereinafter be described in the order in which they occur in practice to insure accuracy of measurements and positions. To more fully make clear the construction and function of these instrumentalities a brief description of the construction of the helmet proper to which they are attached follows:

Referring to Figs. 3, 10, 11, 12, and 13, the base or rim 25 of the helmet is a ring of plate aluminum, the opening in which is considerably greater than the average human head. An outer series of semi-circular or arch ribs 26, preferably nine in number, are rigidly secured to the rim 25 with their lower ends and with their upper ends joined to a central hub 27. Spaced inwardly, radially with the arch ribs 26 are a similar number of arch ribs 28 similarly secured to the base rim 25 and hub 27. Upon the outer arch ribs 26 are arranged the calipers 24 and the arch ribs 26 and 28 are therefore circumferentially spaced with reference to the proper locations of the calipers 24 for properly contacting the various faculty zones of the human head. To effect an easy assembly of the helmet I prefer the following construction of the arch ribs 26 and 28 and hub 27. Slots 29 and 30 are provided in the hub 27 and master arch ribs 26a and 28a are passed through these slots and when secured to the base rim 25 holds the hub 27 against turning movement. Locating hub members 31 and 32 (Figs. 12 and 13) having locking notches 33 and 34 respectively into which the arch ribs fit, are assembled on the hub 27 and rest upon said hub members. The member arch ribs 26 and 28 are made of segmental sections, the notched end of which, abutting the hub 27 are locked in the notches 33 and 34 in the discs 31 and 32, as shown best in Figs. 10 and 11. When fully assembled the hub is tightened by threaded nuts 36 and 37, converting the whole assembly into a rigid ribbed arched headpiece or helmet.

Referring to Figs. 3, 4, and 5 the dotted lines 40 in Fig. 3 and full lines in Fig. 5 represent the contour or shape of the person's head to which the helmet is to be adjusted. The first operation of the adjustment is to establish its correct relation with respect to the external ear orifice. To this end adjusting wire levers 42 and 43 are pivotally connected to the base rim 25 by universal pivots at 44 and 45 and extending to the opposite side of the rim 25 are slidably engaged in circular rack 46 and 47 respectively and movably supported upon balustrades 49 secured to the rim 25. The levers 42 and 43 are arranged to swing in unison towards or away from each other by means of a pinion 50 arranged between and meshing with the lower rack 46 and upper rack 47 connected to the adjusting levers 44 and 45 respectively. The shaft 51 of the pinion is mounted in a bearing block 52 and is provided with a knob 53 by means of which the racks 46 and 47 may be simultaneously operated to swing the adjusting levers 42 and 43 inwards or outwards in adjusting them to the sides of a person's head. About centrally in the base rim opening the levers 42 and 43 are provided with depending ear loops 54 and 55 adapted to fit when the helmet is lowered around the circular ridge behind the ear lobe surrounding the external ear opening. The ear loops are preferably made up in the form of a doubled semi-circular loop of a round wire, the upper ends of which are adjustably but permanently and rigidly attached to the wire levers 42 and 43. By means of their universal pivoted connections to the rim plate 25 the said levers may be rocked to swing the ear loops for adapting them to the local angularity of variously shaped heads. The levers 42 and 43 and their ear loops are moved closely against the head by means of the finger knob 53 and the frictional resistance of the parts keeps them firmly in position.

The frontal distance of the head from the ear orifice is next measured and established by means of a frontal gage member 56, slidingly supported in bearing blocks 57 attached of the under side of the rim plate 25. The gage member 56 carries a vertical loop 58 adapted to rest against the lowest frontal extremity of the skull, and two horizontally projecting loops 60 adapted to enter the nasion or depression at each side of the nose, at the points of juncture of the frontal bone with the two nasal bones, as shown in full lines in Fig. 5 and indicated by dotted lines in Fig. 3. To accurately position this point horizontally, a nose loop 61, is swingingly attached to the gage slide 56 and is adapted to straddle the nose bone when in position.

The distance from the external ear opening to the back of the head is next measured by the rear gage member 62 slidingly arranged in bearing blocks 63 and being provided with an upstanding loop 64 adapted to bear directly on the back part of the skull when in measuring position as indicated by dotted lines in Fig. 3 and shown in full lines in Fig. 5.

Since each one of these adjustments must act simultaneously and proportionally on the measuring and contacting devices in order to correctly establish the moments of each particular measurement, it is now in order to adequately describe the construction and operation of these instrumentalities. In Fig. 5 is illustrated only the master arch ribs 26a and 28a and their supplements of calipers and relating parts but it will be understood that each one of the member arch ribs 26 and 28 as illustrated in Fig. 10 carries their required supplements of these parts to measure and make contact with the various faculty zones of the brain. As indicated in Figs. 5 and 6 the calipers 24 are made of round wire and have free pivotal connection 65 to the outer arch ribs 26 and 26a. The tangent of the arc described by the contact point C of the calipers with the skull 40 leads closely to the external opening of the ear as indicated by line T. From the looped contacting point C of the calipers a circular section 67 with a radius described from the pivotal point 65, extends upwards passing loosely through a guide stud 68 and carrying on its upper end a weight 69. The pivotal end of the wire calipers 24 is formed into an eye 70 through which passes the small end of a shouldered sleeve 71 (Figs. 6 and 8). As best shown in Fig. 5 the calipers 24 extend outside the helmet where weights 69 are located. It is believed to be apparent from this illustration that each caliper may be adjusted by hand, or its adjustment modified as is often to be done. The sleeve is freely rotating on a stud 72, riveted to the arch ring 26 and having an internally threaded outer end for receiving a retaining screw. An electrical contactor 73 is pressed against the shoulder of the sleeve 71, back of the eye of the caliper and the outer end of the sleeve 71 is riveted against the loop of the eye thus fastening the contactor 73 and caliper 24 to the sleeve 71. The length of the stud 72 permits of a free turning movement of the sleeve on the stud, when the retaining screw 75 is screwed into the stud. To securely fasten the caliper 24 and electrical contactor 73 together for accurate movement an extension 76 of the caliper wire passes through a slot 77 in the contactor 73 formed by a contact brush 78 cut out from the turned back end 79 of the contactor 73.

It will be readily seen that as the calipers 24 swing on their pivot in response to a changed position of the calipering points in contact with the skull of a head, the electrical contactor will partake of the movement to a degree corresponding to its length from the pivotal point. A series of gradated contact wires 82 is arranged upon the inner arch ribs 28 over which the contact brush 78 is adapted to sweep with a slight pressure. Normally when not in operation the wire extension 76 rests against a projecting pin 83 and the contact brush 78 is at such time out of contact with the contact wires 82. Each one of these contact wires represents a gradation of development of the particular faculty zone with which the correspondent caliper is in contact. Machines may obviously be constructed with any number of these gradations for each faculty but in the present instance a machine capable of determining and recording five gradations of each measured faculty zone has been illustrated. As shown in Figs. 6 to 9, which illustrate the preferred construction of each one of the electrical contact sections, a segment 84 of fibre or equivalent insulating material is secured to an auxiliary arch number 80 which is adjustably supported upon the arch rib 28 for reasons which will hereinafter appear, and is provided with a recess 85 of sufficient size and depth to accommodate the required number of transmission wires 86, for any number of electrical contacts necessarily arranged on each segment for the measurement and variations of corresponding faculty zones. In the construction of the electrical contact segments 84, small holes are drilled as at 87 and 88 through the segments. The U-shaped loop 82 constituting the contact line is formed near the end of each wire, the parallel sections of the U being passed through the holes and the end of the wire clenched over as at 89. The wire is then passed along in the recess 85 and passed out through a comparative large opening 90 together with all the other similarly constructed wires in the segment which from thence are collectively assembled in an inwardly open channel ring 92 circling the helmet 2 and provided with a common egress 93 (see Fig. 1) from which they are conducted through a flexible tube 94 to a recording instrument, arranged in a housing 100, supported upon brackets 3a and 3b of the standard 3, and of which the details will hereinafter be fully disclosed. The recess 85 is normally closed by a segmental plate 95. The transmission wires 86 being insulated from each other are collectively grounded through the helmet and standard 3 to the recording instrument in the housing 100. The electrical wire contacts 82 may be visibly gradated as in Fig. 8 from 1 to 5, "one" being the lowest calipered stage of the corresponding faculty zone, and "five" the highest.

It is evident that if all human heads were of the same average size and all human brains of the same inherent quality nothing more would be necessary for the proper indication of the varying development of each faculty zone, the collective results of which would then accurately delineate and reflect the individual character. But since normal heads vary both in adults and with special respect to children, special adjustments are imperative to equalize the variations and arrive at the correct delineation and extent of the comparative development of all the faculty zones. In other words, the lowest comparative development of "one" must always indicate "one" no matter what the size of the head. Obviously, if the lowest indication of "one" were obtained on a normal large head, the same development on a smaller head could not be indicated and all other measurements would be correspondingly unduly lowered in gradation. Each one of the three lateral adjustments heretofore described must, therefore, interact to proportionally adjust the contact wires 82 upwards or downwards to maintain the lowest faculty development at the gradation "one" and proportionally all the others at their proper gradations.

Referring now again to Figs. 3, 4, 17, and 18, and the levers 42 and 43 interacting laterally through the racks 46 and 47 and pinion 50 to measure the width of the head the lever 43 carries a swivelled arm 102 which being bent downwards as shown in Fig. 4 has pivotal connection at 103 to the under side of the rim plate 25 of the helmet. Intermediate the swivel and pivot points of the arm 102 is pivoted a link 104, the opposite end of which is pivotally connected at 105 to a floating compensating linkage 106, arranged on the under side of the rim plate 25 and supported from above the plate through slots 107 and 108. The pivot pin 109 of one end of the linkage extends upwards through the slot 107 and is secured in a lever 110 which supports the linkage 106 on that end. A pivot pin 111 on the opposite end of the linkage passes up through the slot 108 and is secured to a sliding gage block 112 which supports the linkage on that end. A curved rigid wire 113 is permanently secured at 114 to one of the outer arch ribs 26 and to a post 115 suitably secured to the rim plate 25. A locking plate 116 is arranged to slide loosely on the wire 113 and is normally held against the gage block 112 by a coil spring 117. The gage block 112 has a bifurcated upper end embracing the wire 113 which serves to guide the sliding of the gage block. An annular ring 118 is arranged between the inner arch ribs 28 and outer arch ribs 26 and is slideably mounted in a series of studs 119 suitably secured to the rim plate 25. The ring 118 is provided with a horizontally projecting handle 120 by means of which it may be turned in either direction. A stop plate 121 is secured to the ring 118 in a position to engage the locking plate 116 when the ring is turned to the right to the position gaged by the sliding gage block 112 as indicated in dotted lines in Fig. 3 and shown in stopped position in Fig. 20. In this position a movement of the ring 118 in the direction of the arrow is arrested by the locking plate 116 which is clinched on its lower square end and against the upper and under side of the wire 113 by the squared surface of the opening through which the wire 113 passes. It will be seen that the extent of the turning movement of the ring 118 from its initial position, indicated by the handle 120 at Fig. 3, towards a position indicated by the dotted lines is controlled by the position of the gage block 112. As this block is connected to the floating compensating linkage 105 at its extreme end the extent of the permissible movement of the ring 118 is in reality determined by the position of the extreme end of the linkage 106. This position is influenced and determined by the combined lateral adjustments of the frontal gage member 56 the rear gage member 62 as determined from the external opening of the ear and the lateral adjustment of the adjusting levers 42 and 43 determining the distance between the ears, as will hereinafter appear. The connection between the adjusting levers 42 and 43 and the linkage 106 has already been explained.

By special reference to Figs. 3 and 35 of the drawings it will be noted that the frontal gage member 56 is provided with a diagonal cam rod 122 having a definite inclination to its lateral movement with the gage member 56. Slidingly supported upon the cam rod 122 is the enlarged terminal 123 of a curved link 124, arranged on the upper side of the rim plate 25, its terminal 123 projecting downwards through a slot 126 in the said rim plate. The opposite end of the curved link 124 is pivotally connected at 127 to the lever 110 having connection to the linkage 106 as above described.

The rear gage member 62 similarly carries a cam rod 128 with substantially the same inclination to the direction of its travel as the frontal cam rod 122. The cam rod 128 passes slidingly through the enlarged end 129 of a curved wire rod 130, which passing from the under side of rim plate 25 through a slot 131 in the rim plate 25 is pivotally connected to the lever 110 at the opposite end 132 from that of the link 124. A suitable slide bearing 133 for the wire rod 130 is arranged upon the under side of the rim plate 25.

From the preceding description it will now be apparent; first, that the concerted movement of the adjusting levers 42 and 43 from the full line position in Fig. 3 to the dotted line position in Figs. 3 and 17 will swing the lever 102 in the direction of the arrow "a" on its pivotal center 103. The lever 110 being held against movement by the frictional resistance of the wire rod 130 and link 124 with connections and the link 104 being connected to the lever 102 and to the floating linkage center 105, the compensating linkage 106 will be contracted and the gage block 112 will move a certain distance in the direction of the arrow in Fig. 19. If next, either one or both together of the frontal and rear gage members 56 and 62, are moved from the position shown in full lines in Fig. 3 to the position indicated by dotted lines in Fig. 3 and in full lines in Fig. 5—the connecting point 105 of the link 104 with the linkage 106 being held against movement by frictional resistance and the sides of the head 40—the first lever 110 of the linkage will be pushed towards the connecting pivot 105 of the link 104 with the linkage which will be further contracted and the gage block 112 will move a still further but definite distance in the direction of the arrow "b" in Fig. 17. The opposite movements of the several gage members will of course cause the gage block 112 to travel in the opposite direction. The position of the gage block 112 determines the exact distance the ring 118 can be thrown from the normal position a of the handle 120 to the adjusted position b in Fig. 3. This distance by the several adjustments proportioned singly and severally determines the extent of the adjustment of the graduating electrical contact point to conform the measurement to the specific size of the head as will, hereafter further appear.

In Figs. 10, 11, 14, 15, and 16 are illustrated the means and operation whereby the turning movement of the gage ring 118 simultaneously adjusts all the gradated contact wires 82 to automatically and proportionally register identical variations of the developments of each particular faculty zone equally on different sizes of heads. As before stated the insulated segments 84 carrying the gradated contact wires 82 are fastened to auxiliary adjusting arch members 80 movably mounted upon the inner arch ribs 28 and 28a by means of headed studs 137 engaged in curved slots 138 as shown in Figs. 11 and 14. Each pair of arch segments 80 mounted on opposite sides of the center hub of the arch form a complete adjusting arch member, being connected together by links 139 bent around the central hub 27 except the pair 81 mounted on the main arch rib 28a which are preferably integrally connected by a section 140 passing under the hub 27. The opposite extreme lower end of each adjusting arch member has attached thereto a bifurcated or recessed follower block 142 adjoining the inner surface of the adjusting ring 118. A series of inclined cam bars 143 are secured to the adjusting ring 118 in positions to be engaged in the recesses of the follower blocks 142. (Figs. 14 and 15.) When, therefore, the adjusting ring 118 is turned around its normal vertical axis each one of the semi-circular adjusting members 80 are turned simultaneously around their own nominal horizontal axis, thus moving the insulated segments 84 and the gradated contact wires attached thereto correspondingly.

Referring to Fig. 5 showing the arrangement of the calipering parts mounted on the main arch ribs 26a and 28a which in a general aspect is a replica of the other arch rib sections, it will be observed that the calipers 24 are pivoted and the gradating parts on the left hand side of the head are located on the lower section of the arches and the corresponding parts on the right hand side of the head are located on the upper portion of the arches. It will be understood that every main arch rib 28 and 28a except the one marked x in Fig. 10 carries one or two adjusting arch members 80 on opposite sides of the central hub 17 as shown in Figs. 10 and 16 and that where two adjusting members 80 are carried by the main arch ribs 28 they are connected to the actuating cam bar 143 at their opposite lower ends. As a consequence when the adjusting ring 118 is turned to move the cam bars 143 the adjusting arch members 80 on each side of the main supporting arches are moved in opposite directions. This reversal of movement is necessary since in order to properly locate the calipering points of the caliper arms with respect to their described arc and pivotal points, some of these points and the gradating parts must be located on the upper portion and some on the lower portion of the arch. The reversal of direction of the gradating contactor 78 is consequent to the necessity of directing the movement of all the calipering points towards the central point of a horizontal line drawn from one ear orifice to the other with the pivotal points of the calipers all above that line.

In Fig. 16 is illustrated the adjustment in gradation of one caliper and contact unit which must be made for different size heads in order to obtain the correct comparative zone measurements. The features and conditions here shown are common to all the measuring units and sections.

It is evident that to maintain the right relationship between the physical contacting point P of the calipers 24 and the electrical contact point E of the contactor 78, when a smaller head S than the head L, is introduced the electrical contact point E must be moved to the left a distance proportionate to the arc of the circles described by the contacting points P and E. With the introduction therefore of a smaller head all the gradating electrical contact points must be simultaneously moved in the direction of the neutral position N of the contactor 82, a distance commensurate with the difference in the size of the head. Conversely for a larger head all the electrical contact points must be moved to a corresponding degree in a direction away from the neutral position of the contactor 82. The extent of these movements is as heretofore explained determined by the combined preliminary measurements of the depth and width of the head as effected by the side, rear, and frontal gage members and communicated cumulatively to the compensating linkage 106, thereby moving the stop plate 116 to the required position. When the adjusting ring 118 in the final adjusting operation is turned to the right until the gage plate 121 strikes the stop plate 116, as shown in Fig. 20 and indicated by dotted lines in Fig. 3, all the upper gradating segments are caused to move upwards and the lower gradating segments downwards towards the neutral as indicated by dotted lines and arrows in Fig. 14, and the relative calipering position of the calipers 24 and the gradating position of the electrical contactor are thus accurately maintained. The gradations of the development of the faculty zones may be of any desired number but are shown to run from 1 to 5, "1" being the lowest development and "5" the highest. An outward position of the calipers 24 raises the contact point and their inward position lowers it. In order to as closely differentiate between the gradation as possible and insure electrical connection with the contact brush 78 is sufficiently broad to span the narrow space between the electrical contact points 82 and contact two or more of these points, the highest one of which is always recorded, the reason for which will appear in the following described matter.

The machine for printing and automatically delivering a permanent record of the operation of the measuring mechanism heretofore described is illustrated in Figs. 21 to 32 inclusive. As indicated diagrammatically in Fig. 37, from each one of 160 contact loops 82 contained in the helmet, an insulated wire 86 is carried through the flexible tube 93 to a recessed dial disc 150, made of fiber or other insulating material and arranged upon a plate 150a (Fig. 36) concentrically around a dialling shaft 151 and secured to the frame 152 of the machine by screws 153. The tube 93 is suitably clamped within the split entrance tube 154 to the recess of the sychronizing disc 150 and the wires 86, assembled in the tube 93, are distributed in the dial disc 150 to form individual contact loops 155 arranged concentrically in a circle around the dialling shaft 151 and constructed substantially as the heretofore described contact loops 82 in the gradating segments of the helmet. For the sake of clarity of illustration only about half the number of terminal contact loops 155 have been shown on the dial disc 150. A series of special contact points 156 are provided in the upper section of the dial disc for the purpose of dialling the headings and special remarks on the printed records as will hereinafter be more fully described. The contact brush 157 (see Figs. 36 and 37) is secured to a dial controller 158 and insulated therefrom by a fiber block 159. In order to secure accurate synchronism of electrical contact of the brush 157 with the recording mechanism the said brush is adjustably secured to the shaft 151 through an arm 158a keyed or otherwise firmly secured to the shaft 151, the pointer 158 being loosely mounted on the said shaft held thereon by a screw 160 and having slotted connection to the arm 158a secured by a screw 161 as shown in Figs. 21 and 36. The inner end 162 of the contact brush 157 continually contacts a conductor disc 163 insulated from the frame and electrically connected by a wire 164 to a terminal 165. Before further describing the electrical and synchronizing means between the printing and recording, and the gradating and contacting instrumentalities it is sequential to explain the printing and recording devices.

Referring to Figs. 24 and 26, a pair of endless sprocket chains 166, carrying intermediate type bars 167 are arranged on each side of the machine and the assembly which will hereinafter be referred to as the type bar chain 166 is driven by sprocket teeth 169 attached to a printing roller 168. The sprockets and printing roller 168 are driven through a train of gears from an electric motor 170, suitably supported as shown between the convolutions of the type bar chain 166 by a bracket 171 secured to a frame plate 172. The train of gears driving the sprocketed roller 168 includes a worm 173 upon the motor shaft 174, in mesh with a worm wheel 175 secured upon a shaft 176, the shaft 176 (see Fig. 23) having a pinion 177 in mesh with a gear 178 upon a shaft 179, which shaft carries a pinion 180 meshing with the large master gear 182 secured to the dialler shaft 151. The master gear 182 meshes with a pinion 183 (Fig. 22) driving the imprint actuating shaft 184 which in turn by means of a gear 185 drives a gear 186 (Fig. 27) secured to the printing roller 168. The ratio of the master gear 182, pinion 183, and gears 185 and 186 are coordinated to the sprockets and diameter of the printing roller 168 so that for one revolution of the master gear, the endless chains 166 and 166 make one complete circuit of its several convolutions. Starting from the printing point P (Fig. 31) on the roller 168 the type bar chain 166 travels rearwards in the direction of the arrow in Fig. 24 over a roller 188, downwards and around a roller 189, forwards and around a roller 190, rearwards and around a roller 191, again forwards and around a roller 192 and rearwards around a roller 193 and lastly forwards around a roller 194 and slantingly upwards to the point of departure. The object of the various convolutions is to compact the 160 and more necessary divisions of the type bar chain in the smallest convenient space. The surface of the rollers 190 and 192 is recessed between the chains so that only the chains 166 and 166 contact the roller to prevent contact of the type surfaces with the roller. A loosely mounted ink carrying roller 196 is arranged opposite the roller 194 and applies ink to the surface of the type surface of the type bars 167. An annular ink distributing disc 197 is loosely mounted for free rotation on a bracket 198 and is spring tensioned to bear against the type bars 167 above the ink roller 196. All the above described rollers are rotatably mounted in the frame members 152 of the machine except the upper rear rollers 188 and 189 which are mounted in swing arms 181 pivotally connected to the frame at 181a (Fig. 21) and provided with a threaded lug 181b engaged by a threaded adjusting bolt 187 by which means the type chain may be adjusted to proper tension.

By reference to Figs. 24 and 31 of the drawings it will appear that the paper tape 199 upon which the record of measurements are to be printed passes from a paper roll 200, placed in an open container 201, upwards past the printing roller 168 and through a vertical tunnel 202 supported upon the frame of the machine at a close proximity to the stationary cutter blade 203 suitably supported upon the tunnel plate 204. The walls of the tunnel 202 converge slightly downwards and a gripping roller 205 (Fig. 27) is loosely arranged within the tunnel which, while permitting the paper tape to move freely upwards by its gravity grips the paper against the converging wall of the tunnel, and holds it firmly against downward movement. The type impression device comprises an outer actuating U-formed yoke 206 and the inner actuated yoke 207 carrying the impress member 208, both yokes being pivotally supported upon a shaft 209. (Figs. 26 and 27.) The impress member 208 is pivotally connected to the actuated yoke 207 at 207a to permit of its simultaneous movement with the moving type when in printing contact, by means of a bar 210 having pivot ends engaged in the side members of the yoke 207. Between the impress member 208 and bar 210 is interposed a resilient thrust spring 212 (Fig. 29) supported by screws 213, which pass loosely through the bar 210 and slots in the spring 212 and are screwed into a thrust bar 214 against which the impress member 208 rests within a hood 215. Normally the assembled impression parts rest against a stop lug 217 (Figs. 29 and 30) arranged upon the outer yoke 206. A stripping plate 218, provided with an opening 219 is swingingly supported by a bail formed wire 220 hooked at each end to the outturned ends 221 of the thrust bar 214 and passing through eyes 222 turned out in the stripping plate 218. The upper ends of the striping plate embrace the lower end of the tunnel 202 loosely enough to permit of a slight swinging movement of the plate. When the parts are in the position shown in Fig. 27 the plate 218 has stripped the paper from the type bars 167 by reason of the angular position of the bail formed wire 220 with respect to the vertical position of the plate.

The inner yoke 207 is actuated to force the impress member 208 against the type bars 167 by means of a transmission bar 224 pivoted at 225 to the lateral part of the yoke 206 and embracing the lateral section of the yoke 207. The opposite end of the transmission bar 224 is bent under the yoke 206 and is formed to receive a bumper member 227 which normally rests against a bumper bar 228, suitably firmly secured to the rigid members of the machine. A coiled spring 230 attached to the transmission bar 224 and frame member 231, normally holds the yokes 206 and 207 in a forward position, the inner yoke 207 resting against the shaft 184 as in Figs. 24 and 27. The shaft 184 carries a ratchet wheel 233 abutting and preferably fastened to the gear 185 driving the shaft 184. A pawl 234 having an inwardly projecting tongue 235, is pivotally connected to the actuating yoke 206 at 236 and is adapted to engage the teeth of the ratchet wheel 233 but is normally held out of contact therewith by gravity and a light spring, not shown.

A magnet 240 is mounted in a U-formed cage 241 that is secured to the frame member 231. A spring actuated armature latch 242 is pivotally mounted to the cage 241 as at 243 and arranged to be controlled by the exposed core ends of the magnet 240. A detent 244 is pivotally connected at 245 to a wing 246 of the magnet cage 241 and a spring 247 normally holds the detent 244 against an upper wing of the armature latch 242, holding the inwardly projecting arm 248 of the detent 244 in a lowered position as indicated by dotted lines in Fig. 31, and full lines in Figs. 27 and 32. In this position the tongue 235 of the pawl lies against the arm 248 of the detent 244 out of engagement with the ratchet wheel 233. When, however, the magnet 240 is magnetized and the armature latch 242 swings to the core of the magnet, the spring 247 pulls the detent 244 to the full lines shown in Fig. 31 and raises the pawl 234 to a level where it will be engaged by the first passing tooth of the ratchet wheel 233 rotating in the direction shown by the arrows. The tongue 235 will then bear against the yoke 206 which will be carried towards the printing roller 168 by the ratchet tooth to the dotted line position in Fig. 31. The yoke 207 will be given an accelerated travel carrying the impression member 208 against the paper tape and against the passing type bar. The bumper member 227 is meanwhile held against the thrust spring 212 but leaving the bumper bar slightly when pressure is applied to the spring to make the imprint on the paper tape. At the conclusion of the impression the ratchet wheel 233 has carried the pawl 234 to the point shown in Fig. 33 where on account of the radius difference between the yoke 206 and ratchet tooth the pawl 234 is forced out of engagement with the ratchet tooth and the spring 230 will return the yokes and connected parts back to the original position.

While the paper tape is in contact with one of the type bars 167 moving in the direction of the arrow in Fig. 31, it moves upwards until released by the impress member and at the end of each operation the recorded paper strip is automatically cut off from the tape just before the machine stops. Referring now to Figs. 22, 23, 27 and 34, a cutter blade 250, having a transverse diagonal shearing edge 251 and a tail piece 252 is slidingly arranged in guideways 253 and 254 on top of the machine. A coil tension spring 255 is mounted to quickly slide the blade 250 from the full line position in Fig. 22 to the dotted line position, which latter is its normal position before the machine is started. The recorded paper tape 199 has during the operation been moved upwards back of the stationary cutter blade 203 through an opening 101 in the housing 100 and will be cut off by the shearing action of the two cutter blades as indicated by dotted lines in Fig. 27. During the operation of the machine the cutter blade 250 is held in the backward position against the tension of the spring 255 by a spring tensioned latch 256 having pivotal connection to the frame member 152 and engaging the tailpiece 252. The depending arm 257 of the latch 256 is connected to a releasing bar 258 (Fig. 23) the opposite end of which slidingly rests upon the shaft collar 259 guided by a strap 260. A release dog 261 having a transverse lug 262 adapted to rest upon the bar 258 and an oppositely projecting lug 263 adapted to be engaged by a stopping pin 264 on the master gear 182, is pivotally connected at 265 to the release bar 258. Normally before the machine is started the parts are in the position shown in full lines in Fig. 34 and dotted lines in Fig. 22. A bell cranked brake lever 266 is pivotally connected to the frame 152 and motor frame 171 at 266a and its brake shoe 266b is spring tensioned against the motor shaft coupling 174a. The crank arm 266 bears against the cutter blade 250 which in the latched backward position holds the brake shoe 266b released from the motor coupling. The tail piece 252 of the cutter blade 250 is then holding the release dog 261 on a raised level to permit the stopping pin 264 on the gear 182 to pass under the lug 263 in starting the machine. The cutter blade 250 is returned manually to the starting position by means of a rod 267 slidingly mounted in a lug 268 on the frame 152 of the machine provided with a hand knob 269 on the outer end of the rod projecting through the housing and a collar 270 on the opposite end engaging a lug 271 arranged upon the cutter blade 250. When the rod is pulled out by the operator to start the machine the collar 270 strikes against the lug 271 and a further outward movement of the rod carries the cutter blade 250 along until the tail piece 252 is caught by the latch 256. A light spring 272 brings the rod 267 back to normal position when released by the operator. Means as hereinafter described are provided to prevent the starting of the machine before the cutter blade has been moved to starting position.

Electric current for driving the machine is supplied to the motor 170 from main line wires 273 and 274 (Figs. 24 and 25) and electric currents are supplied to the magnet 240 and to the registering and dialling instruments by a suitable storage battery 275 arranged in a bottom compartment of the machine housing and having terminal wires 276 and 277. In order that all electrical connections will be automatically made and broken with the insertion or withdrawal of the machine from the housing, the battery wire 276 is connected to a flared terminal socket 278 arranged on the rear end wall of the housing 100 and the battery terminal 277, through a switch mechanism which will be hereinafter described, is similarly connected to a flared terminal socket 279. An insulating block 284 is secured to one side of the machine frame (Figs. 21, 22, and 25) having plug terminals 285 and 286 making electrical connections with the terminal sockets 278 and 279 when the machine is inserted in the housing. A wire 287 connects the terminal 286 with the magnet 240 and a wire 288 connects the plug terminal 285 with the terminal 165 of the insulated conductor disc 163.

The main line wire 273 is connected through a switch 293 and wire 293a to a flared terminal socket 283 and the wire 274 is connected to a similar socket 282. An insulating block 290 having plug terminals 291 and 292 making electrical connections with the terminal sockets 282 and 283 and with the motor 170 through wires 291a and 292b is arranged on the opposite side of the machine frame 152. (Figs. 24 and 25.) The switch 293 (not shown in detail, being of standard construction) is provided with a switch lever 294 having an upward bent arm 295 normally resting, when the switch is open, in a recess 296 of a frame member 297. A bell crank lever 299, one arm of which is connected to the cutter blade 250 by a link 300, is pivotally secured to the frame member 297 at 301 and its crank arms before the machine is started, are positioned as shown in dotted lines in Fig. 22. In this position the rounded end 302 of the short crank arm prevents the switch lever 294 from being moved to close the electrical circuit until the bell crank lever 299 has been thrown to the full line position by the operator when pulling the hand knob 269 to reset the cutter blade as before set forth. When the operation is completed and the cutter blade 250 is released to the dotted line position, the rounded end of the bell crank arm will automatically open the switch and pass in position to again lock the switch. By particular reference to Fig. 25 it will be seen that the same operation will automatically close and open the electrical circuit of the battery 275. This circuit is normally open by switch members 304 and 305, the first of which is connected by a wire 306 to the terminal socket 279 and the latter by the wire 277 to the battery 275. A switch lever 308 is normally held disconnected from the switch member 304 and against a stop pin 309 by a spring 310 as shown in full lines in Fig. 25. When the cutter blade 250 and bell crank lever 299 are moved to the starting position as shown in Fig. 22 preliminary to throwing the switch lever 294 to start the machine, the switch lever 308 will be thrown to the dotted line position in Fig. 25 thereby also closing the battery circuit at this point.

Referring now to the diagrammatical view shown in Fig. 37 in a brief résumé of the complete operation of the apparatus the battery circuit is traced from the battery 275 to the magnet 240, and by wire 312 to the ribs 26, contactors 73 having the contact brushes 78, contact loops 82 corresponding with numbers 3 and 4 gradating the two faculties of "individuality" and "caution" of the sitter for the reading. Since the dialling contact brush 157 automatically stops on the neutral point 0, both the battery and motor circuits are still open. As the switch lever 294 is thrown by the operator the motor circuit is closed starting the motor 170. As the contact brush 157 slowly rotates in the direction of the arrow, the battery circuit remains open until the brush contacts with No. 3 of the contact loops 155. The switch 308 being closed, the electrical circuit is then closed from the battery 275 through wire 277, switch 308, wire 287, magnet 240, by the wire 312 to No. 3 contact loop through contactor 73 in the faculty section "individuality" in the measuring helmet, a transmission wire 86 to the corresponding No. 3 contact loop of the first dialling or selecting section on the dial disc 150, contact brush 257, conductor disc 163 and wires 288 and 276 to battery 275. With the electrical circuit closed, the armature latch 242 releases the detent 244 to raise the pawl 234 to be engaged by a tooth of the rotating ratchet wheel 233, making a print impression on the paper tape 199 in the manner heretofore described, and advancing the said tape upwards while making the imprint and again separating the paper tape from contact with the type bars 166 when the pawl 234 is released from the ratchet wheel 233. It will be understood that there are exactly as many type bars on the type bar chain as there are contact points on the dial disc 150 and that the gear ratios of the master gear 182 driving the dialler shaft 151, the pinion 183, gears 185 and 186 and the spacing and number of teeth in the ratchet wheel 233 and sprocket teeth on the roller 168 are such that for every tooth of the ratchet wheel passing the engaging point of the pawl 234, a corresponding type bar 166 passes the impress point on the type or printing roller 168. The contact brush having passed off the No. 3 contact loop, the electrical circuit is broken until the brush contacts with the contact loop number 4 corresponding to the gradation 4 of the faculty of "caution". The operation is then repeated recording the grade 4 for "caution" and so on in a similar manner around the dial for every faculty of the head in the helmet. When the contact brush 257 reaches the contact points 156 for the special headings and remarks, the operation is the same but the electrical circuit is closed from the battery 275 to the magnet 240, ground 312, contact points 156 in succession, brush 157, conductor disc 163 and battery 275. Each contact with the points 156 is timed to occur regularly with the passage of the type bar carrying the indicated line past the printing point. With the completion of one revolution of the master gear 182, its stopping pin 264 engages the lug 263 on the release dog 261, releasing the cutter blade 250 as heretofore disclosed, the recorded reading and paper strip A is severed from the tape on the line indicated in Fig. 38, the switch levers 294 and 308 are automatically thrown by the bell crank lever 299 to open both the motor and battery circuits, the brake shoe 266b is set on the motor coupling stopping the motor, and the release dog 261 is raised away from the stopping pin 264 to permit of the next starting of the machine.

While the inverted reading matter on the type bars has not been shown on the drawings, it will of course be understood that each group of five type bars, corresponding to the five gradations shown for each faculty, carries the members from "one" to "five" with the appropriate reading. Since obviously various modifications of construction may be made conformant with the principle and within the scope of the invention, I do not limit the claims strictly to the details of construction disclosed.

Having now fully disclosed and illustrated the invention what I claim as my invention is:

1. A measuring and printing apparatus for varying cranial sections, comprising a semi-spherical permanent frame, a plurality of swinging measuring members having hand operable portions outside the frame and contact portions inside, said members being pivoted to said frame at different points in the spherical lines, and arranged to measure and electrically transmit the physical developments of different sections and electro-magnetic printing means cooperating with said measuring members.

2. A measuring and printing apparatus for varying cranial sections comprising a permanent frame of a plurality of semi-circular arches arranged spherically around a common center, a plurality of swinging measuring calipers having actuating portions outside said frame and contact portions inside, said calipers being permanently pivoted to said arches and arranged to measure and electrically transmit the measurements of physical developments of different sections and electro-magnetic printing means cooperating with said calipers.

3. A measuring and printing apparatus for varying cranial sections, comprising a main semi-spherical frame, a plurality of swinging measuring calipers having actuating portions outside said frame and contact portions inside, said calipers being permanently pivoted to the said frame and arranged to measure the physical developments of different sections, a supplemental semi-spherical frame arranged within the main frame, a base member to which both of said frames are permanently secured, electrical contact-segments mounted upon the supplemental frame, and conducting members connected to the measuring calipers and cooperating with the said segments.

4. In a measuring and printing apparatus for varying cranial sections the combination of a plurality of main semi-circular arch ribs arranged spherically around a common center, a plurality of supplementary semi-circular arch ribs spaced from, and arranged radially within the span of the main arch ribs, a base member to which both the main and supplementary arch ribs are secured, a plurality of measuring calipers having actuating portions outside said frame and contact portions inside, said calipers being pivotally mounted upon the main arch ribs and arranged to measure the physical developments of different sections, electrical contact segments adjustably mounted upon the supplementary arch ribs and conducting members connected to the measuring calipers and cooperating with the said segments.

5. The combination set forth in claim 4 with the further elements of a rotatable ring interposed between the main and auxiliary arch ribs and means cooperating with said ring for simultaneously adjusting the said contact segments.

6. In a measuring and printing apparatus for varying cranial sections the combination with a semi-spherical permanent frame of a plurality of swingable calipers having actuating portions extending outside said frame, said calipers being permanently pivoted to said frame at different points in the spherical contour and having caliper points arranged to swing inwards substantially towards the center of the sphere to measure and contact with the physical developments of different sections of the head and electrical printing means cooperating with said calipers for recording the transmitted measurements.

7. In a measuring and printing device for varying cranial sections, the combination with a main semi-spherical frame having a base member and a plurality of measuring calipers pivotally mounted thereon, said calipers having actuating portions extending outside said frame, of lateral adjusting means for proportionally adapting the said device to varying sizes of the head sections to be measured, a compensating device and means for allocating, and combining the several lateral adjustments to said device, a supplemented semi-spherical frame, electrical contact segments mounted for circular adjustments upon the auxiliary frame and means for simultaneously adjusting the said segment relative to the measuring calipers a distance predetermined by the proportional lateral adjustment transmitted to the compensating device.

8. In a measuring and printing device the combination set forth in claim 7 and comprising a movable stop member controlled by the movement of the compensating device, a rotatable locating ring having cam members arranged to move and adjust the segments and a stop lug secured to said locating ring engaging the said movable stop member when said locating ring is moved a distance predetermined by the movement of the compensating device.

9. In a machine of the class described, a device having calipers provided with outwardly extending actuating portions and pivoted to a permanent semi-circular frame for measuring the variations in development of sections of the head, electrical contact devices movably supported on said frame and means for moving said devices mounted upon a supplementary circular frame for circular adjustment relative to the measuring calipers and a recording mechanism comprising means for automatically printing a record of each position of said calipers.

10. In a machine of the class described a device having circularly arranged permanent pivotal members for measuring the variations in development of a human head section, and oppositely movable electrical contact means adjacently arranged to said pivotal member and mounted for circular adjustment relative thereto and a recording mechanism comprising means for automatically printing a record of the positions of said members.

11. In a machine of the class described, a device having circularly arranged pivotal members for measuring the variations in development of a human head, and electrical contact means arranged adjacently to said pivotal members and mounted for circular adjustment relative to said pivoted members, a recording mechanism comprising means controlled by said device for automatically printing a record of the positions of said members and for delivering such record.

12. In a machine of the class described, a device having semi-circular arch ribs and caliper members permanently pivoted thereon for measuring the variations in development of a human head section, electrical contact and conducting means cooperating with said calipers and semi-circular arch ribs, and means for electro-magnetically printing specific matter for each position of said caliper members.

13. In a machine of the class described, a device having a plurality of radially arranged semi-circular frame ribs and a series of caliper members having actuating portions extending outside said frame and contact portions within the frame, said members being pivotally mounted thereon for measuring the variations in the physical development of a human head section and a corresponding plurality of radially arranged electrical contact devices for each of said caliper members cooperating with and mounted for circular adjustment relative to the caliper members and means for printing and delivering a record of each of said calipers in different positions.

14. In a machine of the class described, a device having a plurality of radially and spherically arranged measuring members having actuating portions extending outwardly and portions projecting inwardly for measuring the variations in development of a human head and a plurality of complementary electrical contact devices spherically adjustable relative to the measuring members for different sizes of the human head and a recording mechanism having prepared records for each adjustment of said device and means for printing such records corresponding to the positions of said measuring members of said device.

15. In a machine of the class described a plurality of devices each comprising means for determining the variations in development of a human head, electrical contact devices, means for adjusting the determining means for different sizes of such variations relative to and independent of the contact devices, and a recording mechanism comprising means for making a permanent record of the adjustments of each of said determining means and for delivering said record.

16. In a machine of the class described a device having means for measuring the variations in development of a human head, electrical contact devices, the said contact devices being adjustable in a circular arc for different sizes of such head relative to and independent of the measuring means and a recording mechanism having prepared records for each adjustment of said contact devices and means for automatically printing and delivering the individual records.

17. In a machine of the class described, the combination with a semi-spherical arched frame structure and a plurality of individual caliper members having weighted actuating portions extending outside said frame, said members being pivotally connected to the arches of said structure in permanent relationship to each other of individual electrical contact devices set by the contact of said caliper members with a human head and adjustably mounted upon said frame structure relative to the pivot points of said caliper members, and a recording mechanism controlling by the said electrical contact devices and comprising means for automatically printing a separate record for each measurement by each of said caliper members.

18. In a machine of the class described, the combination of a semi-spherical arched frame structure, a plurality of individual caliper members having weighted actuating portions extending outside said frame, and contacting portions inside, said members being pivotally connected to the arches of said structure in permanent relationship to each other, an individual electrical contact device for each caliper member set by the contact of said member with a human head, a recording mechanism having record printing means and means for arranging a record for printing upon a blank and delivering a printed blank.

19. In a machine of the class described, the combination with a semi-spherical arched frame structure and a plurality of caliper members each having exteriorly extending hand operable portions for moving the caliper members pivotally, said members being pivotally and permanently connected to the arches of said structure, of electrical contact devices set by contact of said caliper members with a human head, means for proportionably adjusting said contact device relative to the permanent pivotal point of the caliper member to different sizes of the head and a recorder having a selective printing mechanism for recording the individual positions of the caliper members.

20. In a machine of the class described, the combination with a permanent semi-spherical frame structure and a plurality of individual self-adjusting caliper members each having exteriorly extending hand operable portions for moving the caliper members, said members being pivotally connected to said structure, of a series of individual electrical contact devices complemented to and set by contact of the caliper members with a human head, means for simultaneously adjusting each of said contact devices relative to the permanent pivotal point of each caliper member and proportionate to their contacting point with different sizes of heads, and a recording mechanism cooperating with each of the individual caliper members and comprising means for selecting and printing different specific matter for each position of said calipers.

21. In a machine of the class described, a measuring and electrical switching device, comprising a semi-spherical arch-ribbed structure provided with an annular base member carrying measuring calipers having pivotal connections to the arched ribs of said structure, said calipers having exteriorly extending weighted portions for moving the calipers inwardly and whereby said calipers may be also hand adjusted, electrical contact segments adjustably mounted upon said structure, means carried by the base member of said structure for locating and supporting the device upon a predetermined section of a human head, and means controlled by said elements for adjusting the said electrical contact segments relative to the pivotal point of the measuring calipers.

22. In a machine of the class described the combination with a structurally ribbed semi-spherical helmet frame, of a swinging arm, linkage including a bail connecting said helmet with said supporting arm, a hollow supporting column supported upon a base member and pivotally carrying said arm, a balancing eccentric member secured to the swinging arm opposite the helmet, a flexible strap connected to the eccentric member and to a follower slideably arranged upon the supporting column, and an adjustable tension spring arranged within the supporting column and connected to the said follower.

In testimony whereof, I affix my signature.

HENRY C. LAVERY.